US012545334B2

(12) United States Patent
Hemphill et al.

(10) Patent No.: US 12,545,334 B2
(45) Date of Patent: Feb. 10, 2026

(54) ASSEMBLY CONFIGURED TO OPERATE AS A HINGE AND DOOR CHECK FOR MOTOR VEHICLE

(71) Applicant: Ford Global Technologies, LLC, Dearborn, MI (US)

(72) Inventors: Joshua Robert Hemphill, White Lake, MI (US); Joe Prior, Detroit, MI (US); Raul Ezequiel Alvarez Ruiz, Estado de Mexico (MX); Michael Shawn Watterworth, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 384 days.

(21) Appl. No.: 18/207,957

(22) Filed: Jun. 9, 2023

(65) Prior Publication Data

US 2024/0409165 A1 Dec. 12, 2024

(51) Int. Cl.
*B62D 33/027* (2006.01)
*E05D 5/06* (2006.01)
(Continued)

(52) U.S. Cl.
CPC ......... *B62D 33/0273* (2013.01); *E05D 5/062* (2013.01); *E05D 11/1071* (2013.01);
(Continued)

(58) Field of Classification Search
CPC .... B62D 33/027; B62D 33/0273; B60J 5/105; E05Y 2900/544; E05D 5/06; E05D 5/062; E05D 11/1007; E05D 11/1028; E05D 11/105; E05D 11/1057; E05D 11/1064; E05D 11/1071; E05C 17/02; E05C 17/0258; E05C 17/04; E05C 17/042; E05C 17/045; E05C 17/12; E05C 17/14;
(Continued)

(56) References Cited

U.S. PATENT DOCUMENTS 3,837,040 A * 9/1974 Keller .................. E05C 17/203 16/85
4,672,715 A * 6/1987 Beckwith ............ E05D 11/1071 16/334
(Continued)

FOREIGN PATENT DOCUMENTS

CN 105133987 A 12/2015
DE 1909173 A1 9/1970
(Continued)

*Primary Examiner* — Roger L Pang
(74) *Attorney, Agent, or Firm* — Vichit Chea; Carlson, Gaskey, Olds, P.C.

(57) ABSTRACT

An assembly may include a body side bracket configured to be mounted to a body of a motor vehicle. The assembly may include a hinge arm rotatably mounted to the body side bracket, wherein the hinge arm is rotatable between a closed position and a fully open position. The assembly may further include a detent arm rotatably mounted to the body side bracket. Further, the assembly may include a cam mounted to the hinge arm and configured to travel along the detent arm with movement of the hinge arm. The cam and detent arm are configured to stop and hold the hinge arm in at least one intermediate position between the closed position and the fully open position.

15 Claims, 9 Drawing Sheets

(51) Int. Cl.
*E05D 11/10* (2006.01)
*B60J 5/10* (2006.01)

(52) U.S. Cl.
CPC .......... *B60J 5/105* (2013.01); *E05Y 2900/531* (2013.01); *E05Y 2900/544* (2013.01)

(58) Field of Classification Search
CPC ........ E05C 17/16; E05C 17/20; E05C 17/203; E05C 17/206; E05C 17/22; E05C 17/24; E05C 17/26; E05C 17/28
USPC ............................................ 296/50, 51, 57.1
See application file for complete search history.

(56) References Cited

U.S. PATENT DOCUMENTS

| | | | | |
|---|---|---|---|---|
| 5,570,498 | A * | 11/1996 | Hipkiss | E05D 7/1044 16/334 |
| 6,568,741 | B1 * | 5/2003 | Leung | E05D 5/062 16/334 |
| 7,438,346 | B1 | 10/2008 | Breed | |
| 7,610,657 | B2 * | 11/2009 | Doswell | E05D 11/1071 16/334 |
| 2002/0069481 | A1 | 6/2002 | Ashline et al. | |
| 2003/0051312 | A1 | 3/2003 | Hoffmann et al. | |
| 2003/0163895 | A1 | 9/2003 | Liang et al. | |
| 2009/0070960 | A1 | 3/2009 | Elliott et al. | |
| 2009/0072582 | A1 | 3/2009 | Elliott et al. | |
| 2009/0106934 | A1 | 4/2009 | Chang et al. | |
| 2009/0217592 | A1 | 9/2009 | Tashima et al. | |
| 2013/0275008 | A1 | 10/2013 | Breed | |
| 2014/0041154 | A1 | 2/2014 | Kamata et al. | |
| 2016/0145922 | A1 * | 5/2016 | Wickliffe | E05D 3/147 296/146.12 |
| 2022/0001728 | A1 * | 1/2022 | Nania | B62D 33/0273 |
| 2022/0153134 | A1 * | 5/2022 | Larry | B60K 35/60 |
| 2022/0194184 | A1 * | 6/2022 | Mather | B60J 1/1823 |

FOREIGN PATENT DOCUMENTS

| | | | |
|---|---|---|---|
| DE | 7406381 | U | 6/1974 |
| DE | 2802463 | A1 | 5/1979 |
| DE | 19951256 | A1 | 5/2001 |
| DE | 102005030680 | | 1/2007 |
| DE | 102010032459 | | 2/2012 |
| FR | 2226858 | P8 | 11/1974 |
| JP | 4557561 | | 10/2010 |

* cited by examiner

ASSEMBLY CONFIGURED TO OPERATE AS A HINGE AND DOOR CHECK FOR MOTOR VEHICLE

TECHNICAL FIELD

This disclosure relates to an assembly for a motor vehicle. The assembly is configured to operate as both a hinge and a door check. In a particular embodiment, the assembly is used relative to a tailgate assembly of a motor vehicle. A corresponding method is also disclosed.

BACKGROUND

Many motor vehicles include cargo spaces for transporting various types of cargo. A pickup truck, for example, includes a cargo bed that establishes a cargo space of the truck. A tailgate typically encloses one end of the cargo bed. The tailgate is movable between closed and open positions for accessing the cargo bed.

SUMMARY

In some aspects, the techniques described herein relate to an assembly for a motor vehicle, including: a body side bracket configured to be mounted to a body of a motor vehicle; a hinge arm rotatably mounted to the body side bracket, wherein the hinge arm is rotatable between a closed position and a fully open position; a detent arm rotatably mounted to the body side bracket; and a cam mounted to the hinge arm and configured to travel along the detent arm with movement of the hinge arm, wherein the cam and detent arm are configured to stop and hold the hinge arm in at least one intermediate position between the closed position and the fully open position.

In some aspects, the techniques described herein relate to an assembly, further including: a biasing member in contact with the detent arm, wherein the biasing member is configured to urge the detent arm into contact with the cam.

In some aspects, the techniques described herein relate to an assembly, wherein the biasing member is a coil spring.

In some aspects, the techniques described herein relate to an assembly, further including: a support bracket mounted to the body side bracket and configured to support the biasing member.

In some aspects, the techniques described herein relate to an assembly, wherein: the detent arm is rotatably mounted about a detent arm rotation axis, the hinge arm is rotatably mounted about a hinge arm rotation axis spaced-apart from the detent arm rotation axis, and the detent arm rotation axis is parallel to the hinge arm rotation axis.

In some aspects, the techniques described herein relate to an assembly, further including: a door side bracket mounted to the hinge arm, wherein the door side bracket is rotatable with the hinge arm, wherein the door side bracket is configured for mounting to a door of the motor vehicle.

In some aspects, the techniques described herein relate to an assembly, wherein: the detent arm includes a contoured surface, the contoured surface includes, when viewed from a perspective of the cam, a first concave section, a second concave section, and a third concave section between the first and second concave sections, wherein the first, second, and third concave sections are spaced-apart from one another along a length of the contoured surface, when the hinge arm is in the closed position, the cam is in contact with the first concave section, when the hinge arm is in the fully open position, the cam is in contact with the second concave section, and when the hinge arm is in a first intermediate position, the cam is in contact with the third concave section.

In some aspects, the techniques described herein relate to an assembly, wherein: the contoured surface includes, when viewed from a perspective of the cam, a fourth concave section between the second and third concave sections, wherein fourth concave section is spaced-apart from the first, second, and third concave sections along the length of the contoured surface, and when the hinge arm is in a second intermediate position, the cam is in contact with the fourth concave section.

In some aspects, the techniques described herein relate to an assembly, wherein: when the hinge arm is in the first intermediate position, hinge arm is rotated an angle between 35-39 degrees about a hinge arm rotation axis relative to the closed position, when the hinge arm is in the second intermediate position, hinge arm is rotated an angle between 68-72 degrees about the hinge arm rotation axis relative to the closed position, and when the hinge arm is in the fully open position, hinge arm is rotated an angle between 108-112 degrees about the hinge arm rotation axis relative to the closed position.

In some aspects, the techniques described herein relate to an assembly, wherein, when the hinge arm is in the fully open position, the hinge arm is rotated an angle greater than 90 degrees about a hinge arm rotation axis relative to the closed position.

In some aspects, the techniques described herein relate to an assembly, wherein the cam and hinge arm are configured to permit movement of the hinge arm between the at least one intermediate position, the closed position, and the fully open position upon application of a force equal to or greater than a threshold force.

In some aspects, the techniques described herein relate to an assembly, wherein: the assembly is configured to permit rotation of a door subassembly of a tailgate assembly of a motor vehicle, the tailgate assembly includes a frame assembly providing a cargo bed access opening, the door subassembly is configured to close the cargo bed access opening when the hinge arm is in the closed position, and the door subassembly is configured to permit access through the cargo bed access opening when the hinge arm is in the at least one intermediate position and the fully open position.

In some aspects, the techniques described herein relate to an assembly, wherein the body side bracket is mounted to the frame assembly.

In some aspects, the techniques described herein relate to an assembly, wherein, when the hinge arm is in the closed position, wherein the tailgate assembly is pivotable about a horizontal axis between a tailgate closed position and a tailgate open position.

In some aspects, the techniques described herein relate to an assembly, wherein the hinge arm is rotatable about a hinge arm rotation axis perpendicular to the horizontal axis.

In some aspects, the techniques described herein relate to an assembly, wherein the cam includes a roller.

In some aspects, the techniques described herein relate to an assembly, wherein: the hinge arm includes a first section and a second section spaced-apart from one another by a curved section, and the curved section is configured such that the first section is inclined relative to the second section at an angle less than 90°.

In some aspects, the techniques described herein relate to a tailgate assembly, including: a frame subassembly having a cargo bed access opening; and a door subassembly that is pivotably connected to the frame subassembly, wherein the door subassembly includes an assembly configured to operate as a hinge and a door check.

In some aspects, the techniques described herein relate to a tailgate assembly, wherein, when the door subassembly is in a closed position, the tailgate assembly is pivotable about a horizontal axis between a tailgate closed position and a tailgate open position.

In some aspects, the techniques described herein relate to a method, including: moving a door subassembly of a tailgate assembly from an open position to either an intermediate position or a fully open position to permit access through a cargo bed access opening of the tailgate assembly, wherein the door subassembly includes an assembly configured to operate as a hinge and a door check.

BRIEF DESCRIPTION OF THE DRAWINGS

In FIG. 1, a door subassembly of the tailgate assembly is in a closed position.

In FIG. 4, the assembly is in a fully open position.

DETAILED DESCRIPTION

This disclosure relates to an assembly for a motor vehicle. The assembly is configured to operate as both a hinge and a door check. In a particular embodiment, the assembly is used relative to a tailgate assembly of a motor vehicle. A corresponding method is also disclosed. Among other benefits, this disclosure provides a single assembly configured to provide the functionality of both a hinge and a door check. The disclosed assembly does not use elastomeric (i.e., rubber) bumpers, and in general exhibits a lesser mass and a lesser volume than prior assemblies. Further, the disclosed assembly reduces the number of visible components relative to known assemblies, which increases the aesthetic appearance of the motor vehicle.

Figure 1:
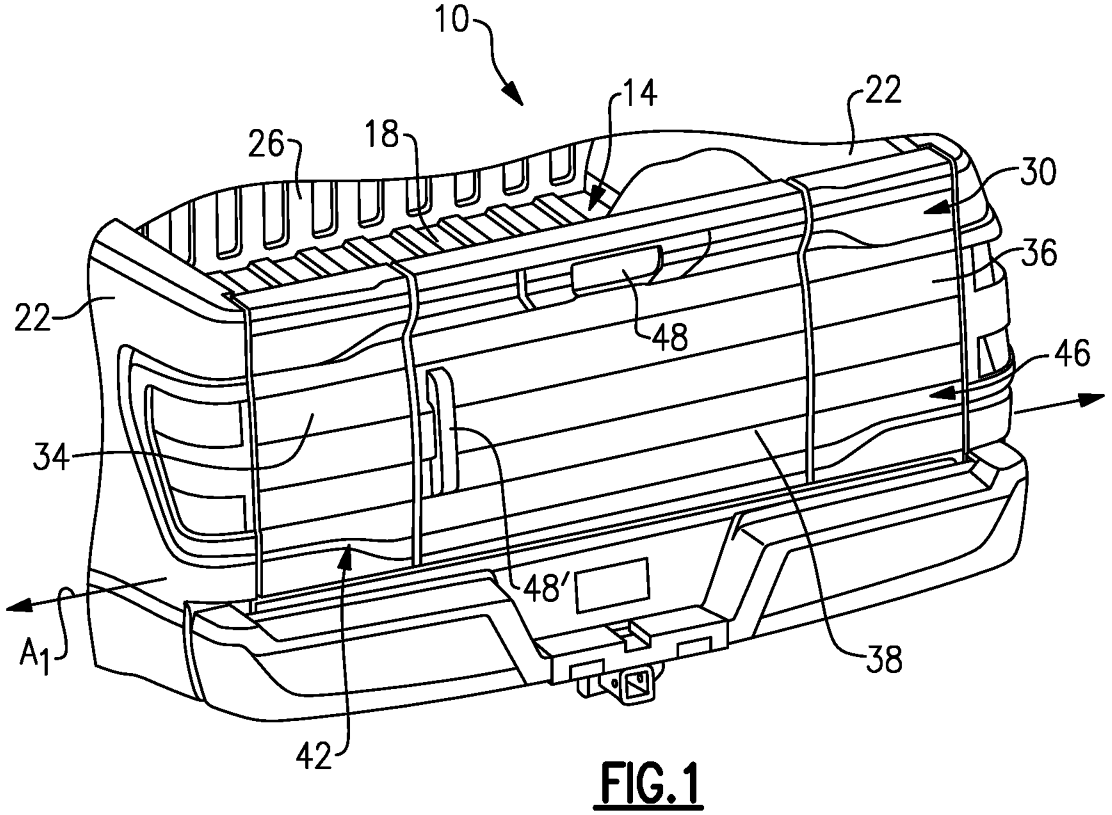
FIG. 1 is a rear perspective view of a motor vehicle equipped with a cargo space and a tailgate assembly positioned in a tailgate closed position relative to the cargo space.
Figure 2:
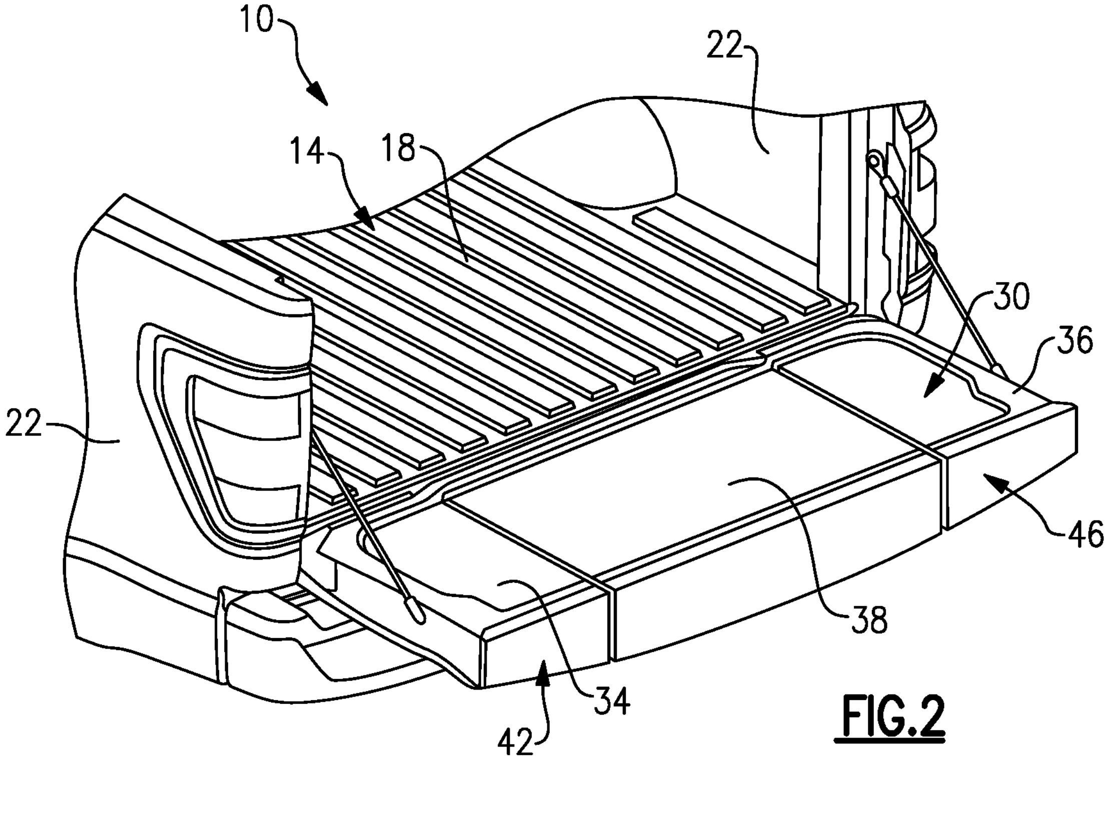
FIG. 2 illustrates the tailgate assembly of FIG. 1 in a tailgate open position, and the door subassembly in the closed position.
Figure 3:
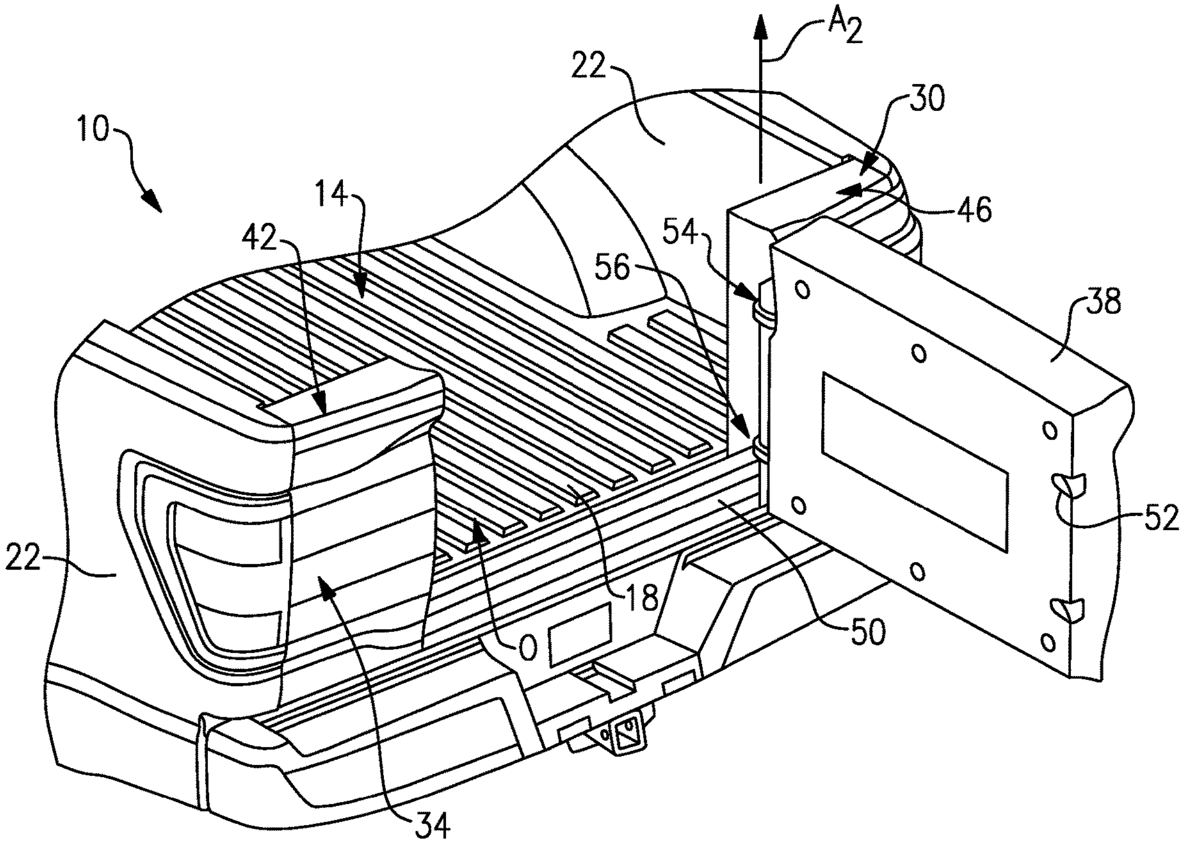
FIG. 3 illustrates the tailgate assembly in the tailgate closed position, and the door subassembly in a fully open position.

FIGS. 1-3 illustrate selected portions of a motor vehicle 10 that includes a cargo space for storing and/or hauling cargo. In the illustrated embodiment, the vehicle 10 is a pickup truck and the cargo space is established by a cargo bed 14 of the pickup truck. While a pickup truck with a cargo bed is specifically depicted and referenced herein, other vehicles having other types of swinging doors could benefit from the teachings of this disclosure. The vehicle 10 could be a conventional, internal combustion engine powered vehicle, a traction battery powered electric vehicle, a hybrid vehicle, an autonomous vehicle (i.e., a driverless vehicle), etc.

The cargo bed 14 is generally rearward of a passenger cabin (not shown) of the vehicle 10 and includes a floor 18 (sometimes referred to as a bed) extending between a pair of longitudinally extending sidewalls 22, a laterally extending front wall 26, and a tailgate assembly 30.

The tailgate assembly 30 can be considered a multi-axis tailgate and includes, among other things, a frame subassembly 34 and a door subassembly 38. The frame subassembly 34, in the exemplary embodiment, includes a first side section 42, a second side section 46, and a connector 50 (see FIG. 3) connected between the first side section 42 and the second side section 46. In geographic regions such as North America, the first side section 42 is a driver side section 42, and the second side section 46 is a passenger side section.

The door subassembly 38 may sometimes be referred to as a "swing gate subassembly." The door subassembly 38 is pivotably connected to the second side section 46, in this example. The door subassembly 38 latches to the first side section 42 through a latch assembly 52 when closed.

At least one assembly is used to pivotably connect the door subassembly 38 to the second side section 46. In this example, two assemblies 54, 56, which may be referred to as hinge assemblies, connect the door subassembly 38 with the second side section 46. The assemblies 54, 56 are operable as hinges and as door checks (or, door check mechanisms), as will be discussed below. The assemblies 54, 56 are spaced-apart from one another relative to a height of the door subassembly (i.e., the up-and-down direction, relative to FIG. 3). While the assemblies 54, 56 are mounted between the door subassembly 38 and the second side section 46, the assemblies 54 could be mounted to the first side section 42. In that example, the door subassembly 38 would latch to the second side section 46.

The tailgate assembly 30 is pivotable about a first axis A1 relative to the cargo bed 14 back-and-forth between a tailgate closed position shown in FIG. 1 and a tailgate open position shown in FIG. 2. The tailgate assembly 30 may be moved from the tailgate closed position to the tailgate open position in response to actuating a first handle 48 of the tailgate assembly 30, for example. In the tailgate closed position, the tailgate assembly 30 encloses an end of the cargo bed 14 that is opposite from the front wall 26, and in the tailgate open position the tailgate assembly 30 allows access to the cargo bed 14.

When the frame subassembly 34 and the door subassembly 38 are pivoted between the tailgate closed position and the tailgate open position, the door subassembly 38 is in a closed position and is latched to the frame subassembly 34. Thus, the frame subassembly 34 and the door subassembly 38 pivot together as a unit when the tailgate assembly 30 is transitioned back and forth between the tailgate closed position and the tailgate open position.

When in the tailgate closed position, the door subassembly 38 is pivotable relative to the frame subassembly 34 about a second axis A2 between the closed position shown in FIG. 1 and a fully open position shown in FIG. 3. The door subassembly 38 is also moveable to at least one intermediate position between the closed and fully open positions. In this example, the first axis A1 is a horizontally-extending axis, and the second axis A2 is transverse to the first axis A1 and is a vertically-extending axis. In particular, the second axis A2 is perpendicular to the first axis A1. The door subassembly 38 may be moved between the door closed position and the door open position by grasping a second handle 48' (see FIG. 1) of the tailgate assembly 30, for example.

The door subassembly 38 provides a cargo bed access opening O when moved to the door open position. In an embodiment, the cargo bed access opening O extends vertically downward at least as far as the floor 18 of the cargo bed 14. A user can access the cargo bed 14 through the cargo bed access opening O when the door subassembly 38 is in the fully open position or one of the intermediate positions. Placing the door subassembly 38 in one of the intermediate positions or in the fully open position allows a user to move closer to the cargo bed 14 than, for example, when the tailgate assembly 30 is positioned in the tailgate open position of FIG. 2. The cargo bed access opening O can also provide clearance for a user to enter the cargo bed 14 to either load or retrieve an item of cargo.

In this disclosure, the assemblies 54, 56 operate as both hinges, permitting the door subassembly to pivot between the closed and fully open positions, as well as door checks. A door check is a mechanism configured to stop and hold a door in a closed position, a fully open position, or an intermediate position, unless or until a force equal to or greater than a threshold force is applied to the door. In this way, forces that do not meet or exceed the threshold force will not cause movement of the door. For example, when the door is in a fully open position, the door check will hold the door in that position, resisting forces that do not meet the threshold, such as the force of gravity if the vehicle 10 is parked on a slight slope, as one example.

The assembly 54 will now be described in detail. It should be understood that the assembly 56 is configured substantially similarly, if not identically, to assembly 54. While two assemblies 54, 56 are shown relative to the door subassembly 38, it should be understood that this disclosure extends to arrangements having one or more assemblies. Further, while the assemblies 54, 56 are depicted relative to a door subassembly for a tailgate of a pickup truck, this disclosure extends to assemblies used in other applications, such as for other swinging body panels of a motor vehicle.

Figure 4:
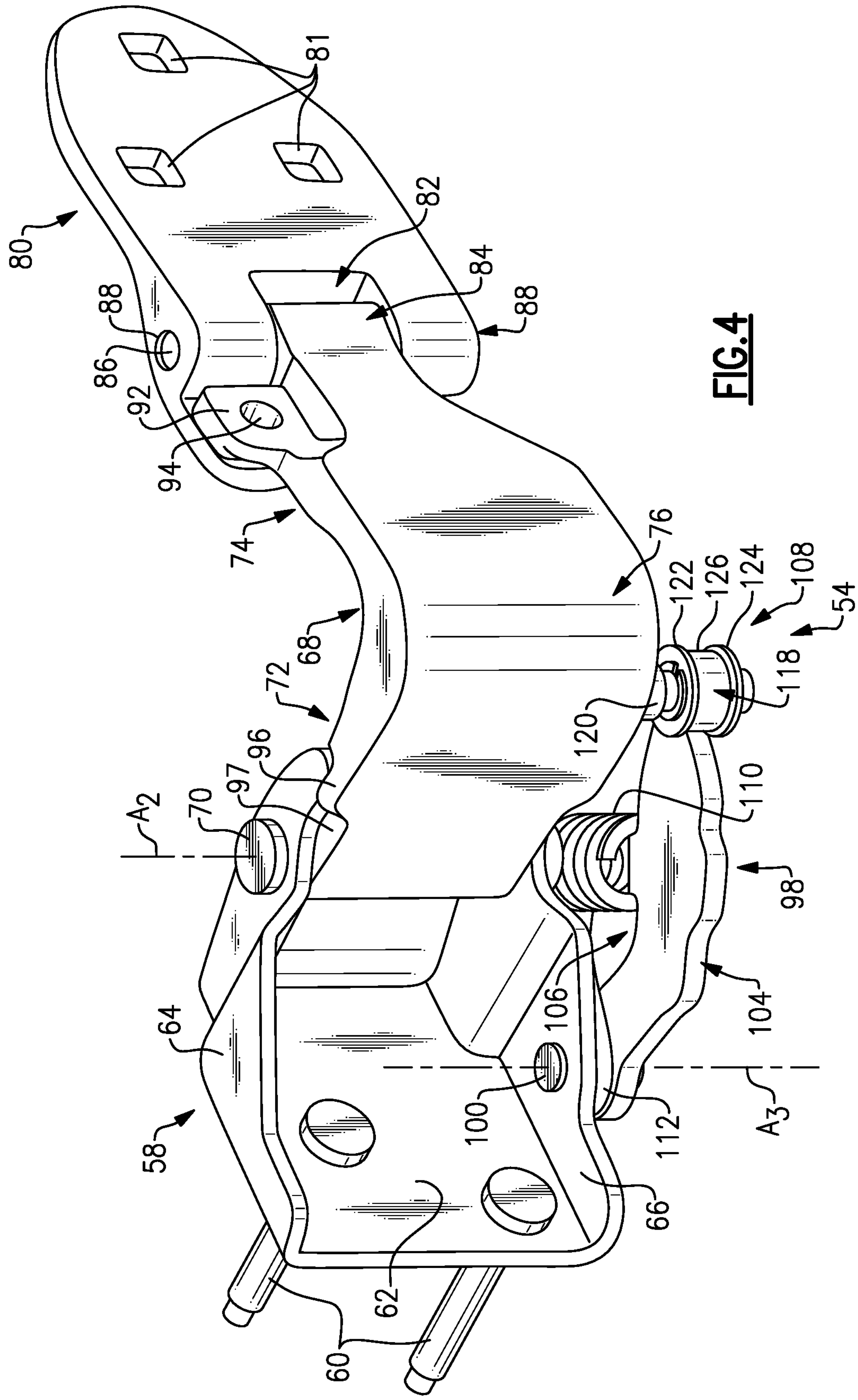
FIG. 4 is a perspective view of an example assembly operable as a hinge and a door check.

With reference to FIG. 4, the assembly 54 includes a body side bracket 58 mounted to the second side section 46 using fasteners 60. The body side bracket 58 includes a main wall 62, which includes openings receiving fasteners 60, and upper and lower walls 64, 66 projecting from upper and lower edges of the main wall 62. The terms “upper” and “lower” are used relative to the orientation of the assembly in FIG. 4, and are not otherwise limiting.

Figure 5:
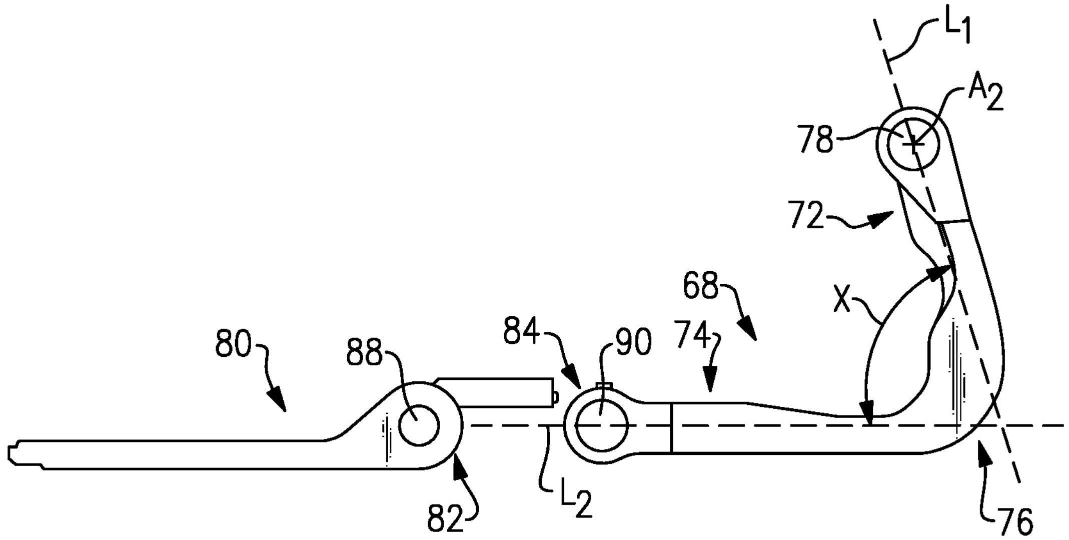
FIG. 5 is a bottom view of a hinge arm and a door side bracket of the assembly of FIG. 4.

The body side bracket 58 rotatably supports a hinge arm 68. The hinge arm 68 is rotatable about a pin 70, which extends along second axis A2 between the upper and lower walls 64, 66. The hinge arm 68 generally includes a first section 72 adjacent the body side bracket 58, a second section 74 opposite the body side bracket 58, and a curved section 76 connecting the first and second sections 72, 74. As shown in FIG. 5, the first section 72 extends along a first longitudinal axis $L_1$ and the second section 74 extends along a second longitudinal axis $L_2$ non-parallel to the first longitudinal axis $L_1$. In this example, an angle X less than 90° is formed between the first and second longitudinal axes $L_1$, $L_2$. The angle X is measured on a concave side of the hinge arm 68. The configuration of the hinge arm 68 is such that the hinge arm 68 and/or the assembly 54 overall may be referred to as a “goose neck” hinge.

As shown in FIG. 5, the first section 72 includes an opening 78 configured to receive the pin 70, to facilitate rotation of the hinge arm 68 about the second axis A2. In this example, the hinge arm 68 is mounted to the door subassembly 38 such that the hinge arm 68 rotates together with rotation of the door subassembly 38 about second axis A2. To this end, the door subassembly 38 is attached to the hinge arm 68 via a door side bracket 80.

The door side bracket 80 includes three openings 81 (FIG. 4), in this example, to receive fasteners that attach the door side bracket 80 to the door subassembly 38, and in particular to a door panel thereof. The door side bracket 80 is also attachable to the hinge arm 68 such that the hinge arm 68 and the door side bracket 80 do not rotate relative to one another after installation.

Adjacent the hinge arm 68, the door side bracket 80 includes a slot 82 configured to receive an end section 84 of the second section 74 of the hinge arm 68. A fastener 86, such as a pin, projects through openings 88 in the door side bracket 80 and an opening 90 in the second section 74 of the hinge arm 68 within the slot 82. The fastener 86 extends along a length dimension parallel to the second axis A2. Further, the hinge arm 68 includes a mounting lobe 92 having an opening 94 configured to receive a fastener that connects the hinge arm 68 to the door side bracket 80.

In FIG. 4, the assembly 54 is shown in the fully open position. To prevent movement of the assembly 54 beyond the fully open position, the hinge arm 68 includes a tab 96 configured to abut the upper wall 64. The tab 96 is adjacent a groove 97 having a relatively lesser height dimension than the tab 96, such that the hinge arm 68 fits between the upper and lower walls 64, 66 at locations corresponding to the groove 97, but not at locations corresponding to the tab 96.

The assembly 54 further includes a plurality of components configured to operate as a door check. In this example, the assembly includes a detent arm 98 rotatably mounted to the body side bracket 58 about an third axis A3, which may be referred to as a detent arm rotation axis, which is spaced-apart from but parallel to second axis A2, which may be referred to as a hinge arm rotation axis. Specifically, the detent arm 98 is rotatably mounted about third axis A3 via fastener 100, which may be a pin, which is attached to lower wall 66.

Detent arm 98 includes an opening 102 (FIG. 6) receiving the fastener 100. Permitting rotation of the detent arm 98 about third axis A3 facilitates contact between the detent arm and a cam 108, such that the cam 108 can travel along the detent arm 98, providing the user with a smooth, soft sensation when moving the door subassembly 38.

Detent arm 98 further includes a first surface 104 and a second surface 106. The first surface 104 is configured to contact the cam 108, which is mounted to the hinge arm 68. The second surface 106 is generally opposite the first surface 104, and is configured to interface with a biasing member 110, which urges the detent arm 98 into engagement with the cam 108. The biasing member 110 may be a coil spring.

Figure 7:
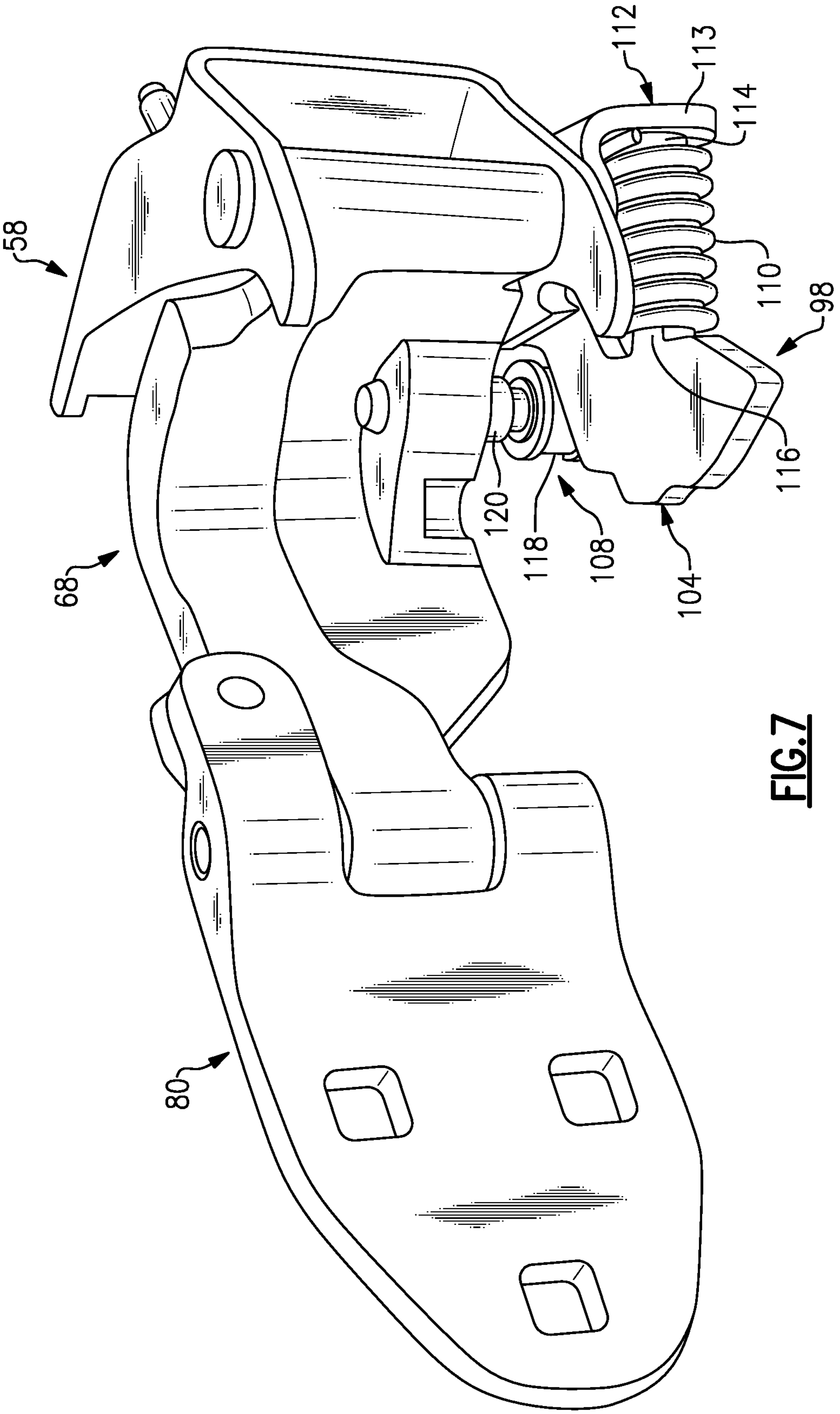
FIG. 7 is a perspective view of the assembly of FIG. 4 in a closed position.

As perhaps best seen in FIG. 7, a support bracket 112 is mounted to the lower wall 66, and supports the biasing member 110. The support bracket 112 includes a wall 113 in contact with an axial end of the biasing member 110, and the wall 113 includes a tab 114 projecting into an axial end of the biasing member 110. The support bracket 112 is mounted to the lower wall 66 using the fastener 100, in this example. Opposite the wall 113, an axial end of the biasing member 110 receives a tab 116 projecting from the second surface 106 of the detent arm 98.

The cam 108, in this example, is provided by a roller 118 configured to rotate about a pin 120 projecting from the hinge arm 68. The roller 118 may be grooved, and in particular may include upper and lower rims 122, 124 configured to maintain a vertical position of the cam 108 relative to the detent arm 98. A main section 126 vertically between rims 122, 124, and exhibiting a lesser diameter than rims 122, 124, is configured to directly contact the first surface 104, in this example. While a roller 118 is shown, the cam 108 could be provided by another structure.

Figure 6:
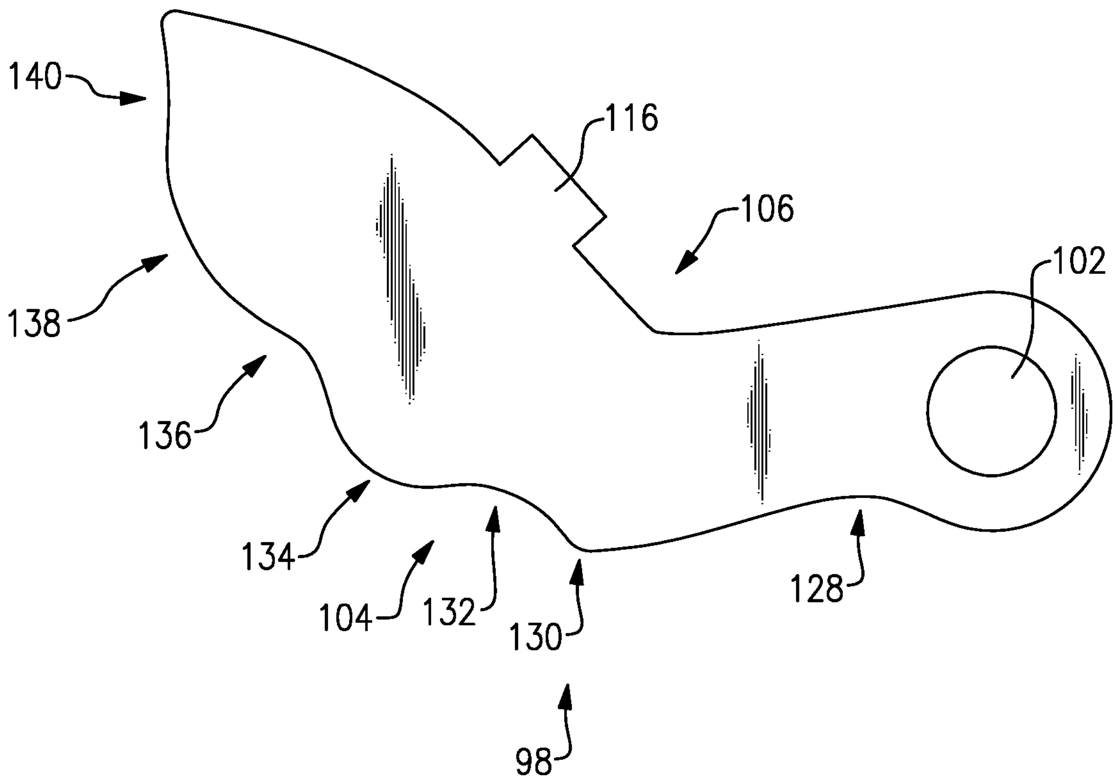
FIG. 6 is a bottom view of a detent arm of the assembly of FIG. 4.

The contour of the first surface 104 will now be described with reference to FIG. 6. In this example, the contour of the first surface 104 is configured to interface with the cam 108 to act as a door check configured to stop and hold the hinge arm 68, and in turn the door subassembly 38, in a closed position, a fully open position, and two intermediate positions. Adjacent the opening 102, the first surface 104 includes a first concave section 128. Moving along the first surface 104 in a direction away from the opening 102, the first surface 104 exhibits an inflection point and transitions into a first convex section 130. Moving further away, the first surface 104 exhibits another inflection point and transitions into a second concave section 132. Moving further, the first surface 104 exhibits another inflection point and transitions into a second convex section 134. Next, the first surface 104 exhibits another inflection point and transitions into a third concave section 136. Moving further, the first surface 104 exhibits another inflection point and transitions into a third convex section 138. Finally, the first surface 104 exhibits another inflection point, transitioning into a fourth concave section 140 adjacent an end of the detent arm 98 opposite the opening 102.

The concave and convex sections 128, 130, 132, 134, 136, 138, 140 are concave and convex, respectively, when viewed from a perspective of the cam 108, in this example. Further, while a particular number of concave and convex sections have been shown and described, this disclosure extends to other arrangements, including arrangements with three or more concave sections and two or more convex sections. Further still, while the concave and convex sections have been described as being concave and convex, respectively, they could be configured differently, such as being generally or substantially concave or convex, in other examples.

Figure 8:
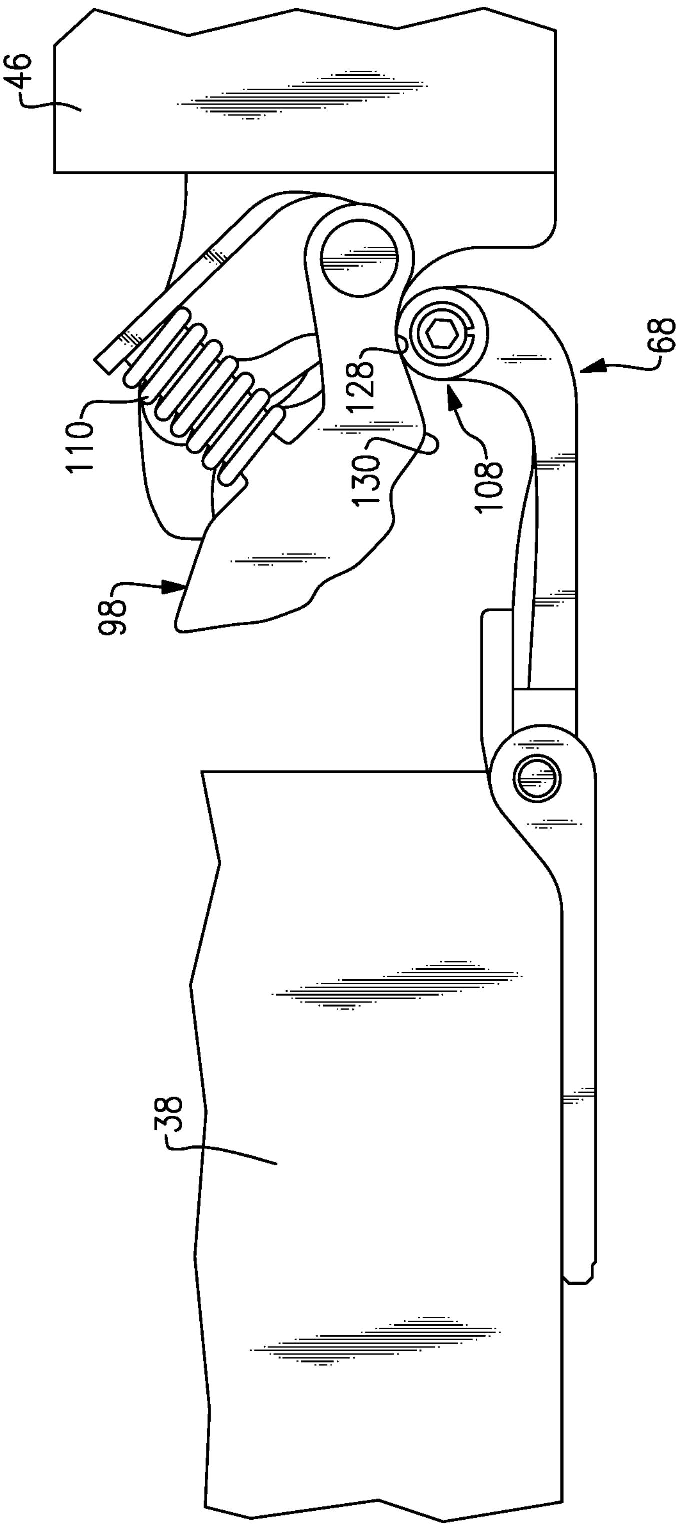
FIG. 8 is a bottom view of the assembly of FIG. 4 in a closed position.

An example method of opening the door subassembly 38 will now be described. With reference to FIG. 8, the door subassembly 38 is in the closed position. The door subassembly 38 and the second side section 46 are shown schematically in FIG. 8. In the closed position, the cam 108 is in contact with the first concave section 128 of the detent arm 98.

Figure 9:
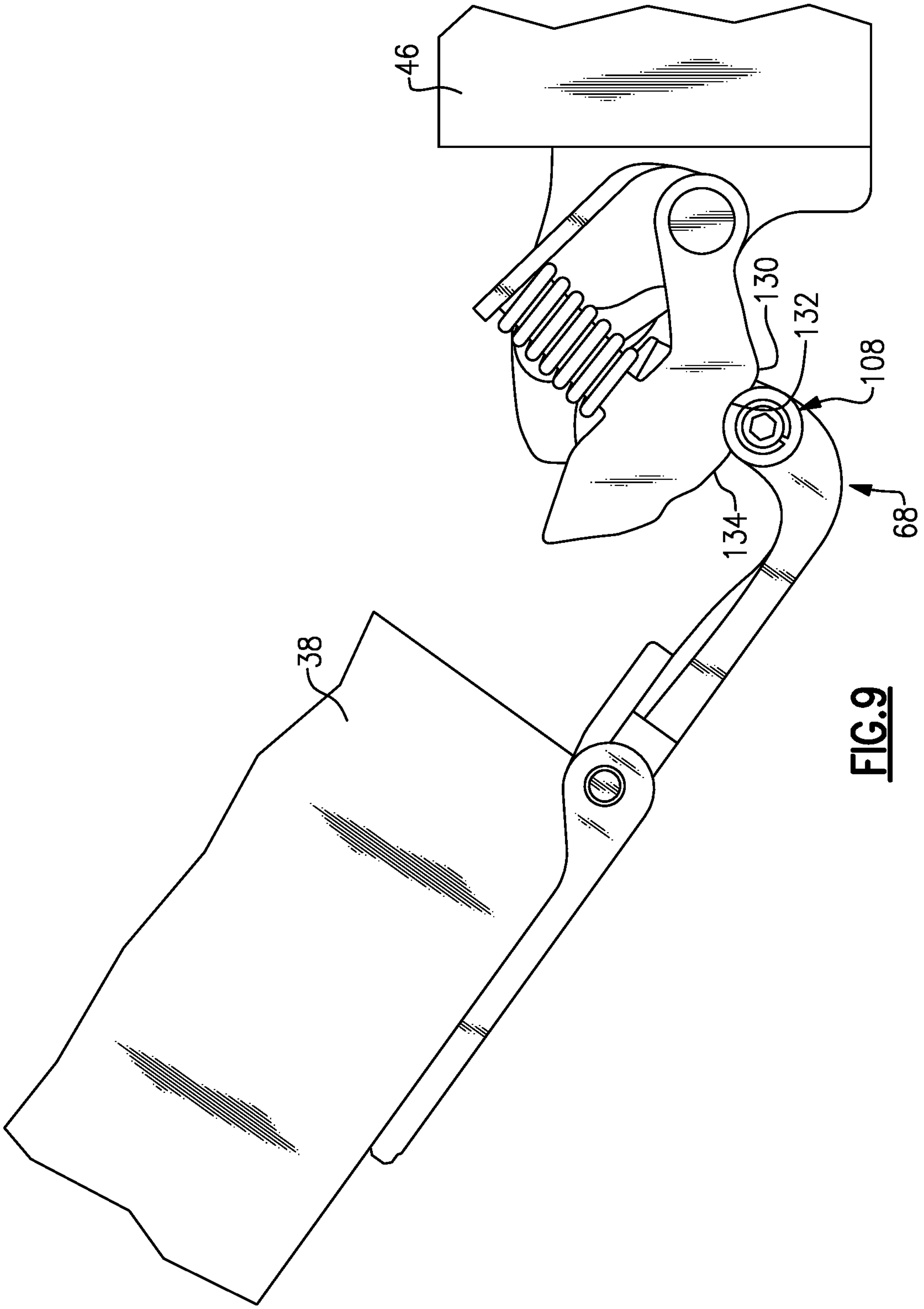
FIG. 9 is a bottom view of the assembly of FIG. 4 in a first intermediate position.

In order to move the door subassembly 38 and hinge arm 68 from the closed position of FIG. 8, a threshold force is must be applied to the door subassembly 38 that overcomes the force of the biasing member 110 on the detent arm 98 such that the cam 108 can move past the first convex section 130. In FIG. 9, a user has done that.

In FIG. 9, the hinge arm 68, and in turn the door subassembly 38, are in a first intermediate position, which is a first position between the closed and fully open positions. In the intermediate position, the cam 108 is in contact with the second convex section 132. The arrangement of the cam 108 within the second convex section 132, namely between the concave sections 130, 134, under the force of the biasing member 110 holds the door subassembly 38 in the first intermediate position unless the threshold force is applied.

Figure 10:
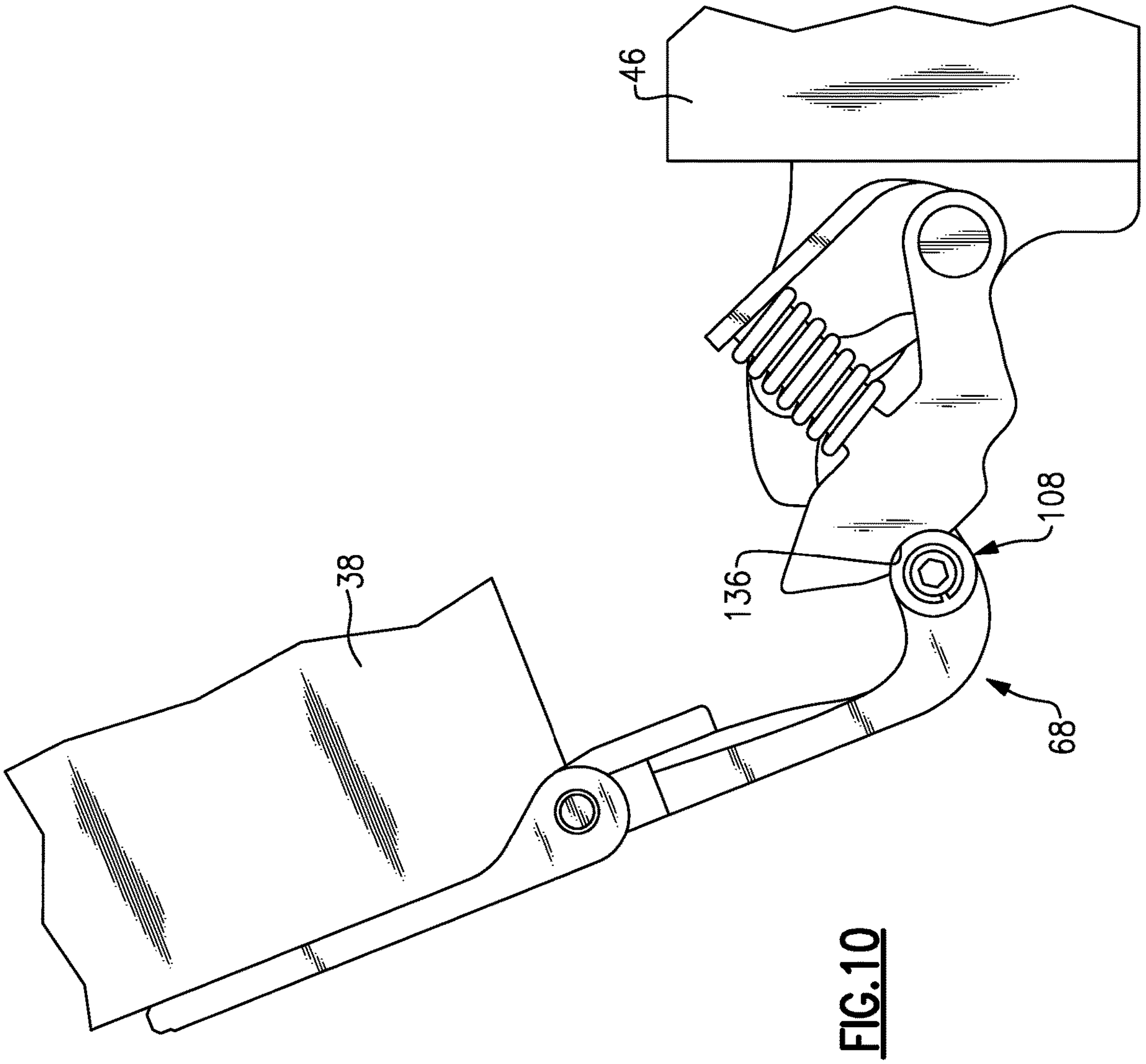
FIG. 10 is a bottom view of the assembly of FIG. 4 in a second intermediate position.

In FIG. 10, the door subassembly 38 and hinge arm 68 are in a second intermediate position. In FIG. 10, cam 108 is in contact with the third convex section 136. As with the first intermediate position, the door subassembly 38 is held in the second intermediate position unless the threshold force is applied.

Figure 11:
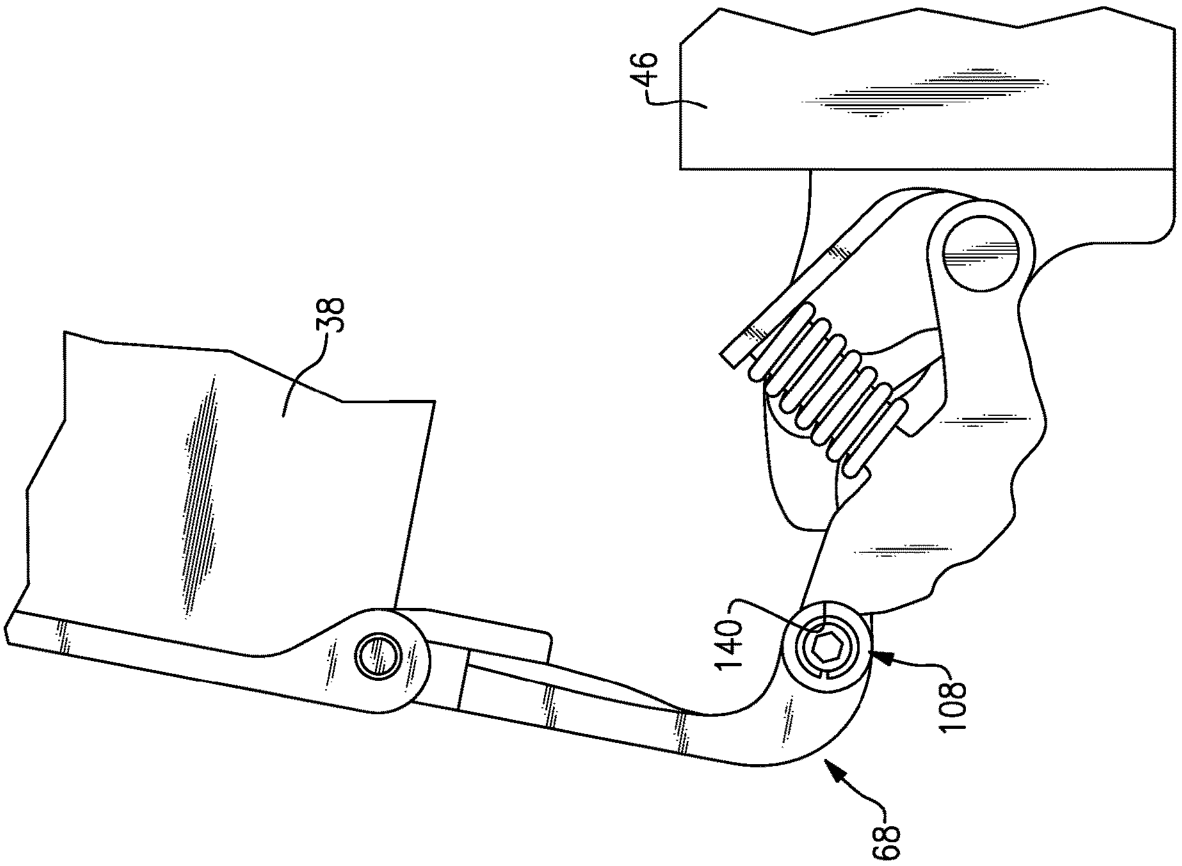
FIG. 11 is a bottom view of the assembly of FIG. 4 in a fully open position.

FIG. 11, the door subassembly 38 and hinge arm 68 are in the fully open position. As shown, the cam 108 is in contact with the fourth convex section 140. The door subassembly 38 is held in the fully open position unless the threshold force is applied.

In an example of this disclosure, when the door subassembly 38 and hinge arm 68 are in the first intermediate position, hinge arm 68 has rotated an angle between 35-39 degrees about second axis A2 relative to the closed position. When in the second intermediate position, the hinge arm 68 has rotated an angle between 68-72 degrees about second axis A2 relative to the closed position. The angles of the first and second intermediate positions are set, in this example, to permit access through cargo bed access opening O while reducing the likelihood of contact between the door subassembly 38 and structures that may found adjacent a rear of the motor vehicle 10, such as a trailer towed by the vehicle 10, or another parked vehicle. Finally, when in the fully open position, the hinge arm 68 has rotated an angle between 108-112 degrees about second axis A2 relative to the closed position. By rotating the hinge arm 68 to an angle greater than 90° in the fully open position, additional space is provided for a user to access the rear door opening O. While these angles have been described relative to the hinge arm 68, it should again be understood that the door subassembly 38 has rotated with the hinge arm 68 by these same angles.

It should be understood that terms such as "left," "right," "about," "substantially," and "generally" are not intended to be boundaryless terms, and should be interpreted consistent with the way one skilled in the art would interpret those terms. Further, directional terms such as "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly for a motor vehicle, comprising:

a body side bracket configured to be mounted to a body of a motor vehicle;

a hinge arm rotatably mounted to the body side bracket, wherein the hinge arm is rotatable between a closed position and a fully open position;

a detent arm rotatably mounted to the body side bracket; and a cam mounted to the hinge arm and configured to travel along the detent arm with movement of the hinge arm, wherein the cam and detent arm are configured to stop and hold the hinge arm in at least one intermediate position between the closed position and the fully open position, wherein, when the hinge arm is in the fully open position, the hinge arm is rotated an angle greater than 90 degrees about a hinge arm rotation axis relative to the closed position, wherein the hinge arm includes a tab configured to contact the body side bracket when the hinge arm is in the fully open position, wherein the tab is configured to prevent rotation of the hinge arm beyond the fully open position, wherein the hinge arm includes a groove adjacent the tab, wherein the groove is configured to permit a portion of the hinge arm to fit between upper and lower walls of the body side bracket, and wherein, when the hinge arm is in the fully open position, the tab contacts a side face of the upper wall of the body side bracket.

2. The assembly as recited in claim 1, further comprising:

a biasing member in contact with the detent arm, wherein the biasing member is configured to urge the detent arm into contact with the cam.

3. The assembly as recited in claim 2, wherein the biasing member is a coil spring.

4. The assembly as recited in claim 3, further comprising:

a support bracket mounted to the body side bracket and configured to support the biasing member.

5. The assembly as recited in claim 1, wherein:

the detent arm is rotatably mounted about a detent arm rotation axis, the hinge arm is rotatably mounted about a hinge arm rotation axis spaced-apart from the detent arm rotation axis, and the detent arm rotation axis is parallel to the hinge arm rotation axis.

6. The assembly as recited in claim 1, wherein:

the detent arm includes a contoured surface, the contoured surface includes, when viewed from a perspective of the cam, a first concave section, a second concave section, and a third concave section between the first and second concave sections, wherein the first, second, and third concave sections are spaced-apart from one another along a length of the contoured surface, when the hinge arm is in the closed position, the cam is in contact with the first concave section, when the hinge arm is in the fully open position, the cam is in contact with the second concave section, and when the hinge arm is in a first intermediate position, the cam is in contact with the third concave section.

7. The assembly as recited in claim 6, wherein:

the contoured surface includes, when viewed from a perspective of the cam, a fourth concave section between the second and third concave sections, wherein fourth concave section is spaced-apart from the first, second, and third concave sections along the length of the contoured surface, and when the hinge arm is in a second intermediate position, the cam is in contact with the fourth concave section.

8. The assembly as recited in claim 7, wherein:

when the hinge arm is in the first intermediate position, hinge arm is rotated an angle between 35-39 degrees about a hinge arm rotation axis relative to the closed position, when the hinge arm is in the second intermediate position, hinge arm is rotated an angle between 68-72 degrees about the hinge arm rotation axis relative to the closed position, and when the hinge arm is in the fully open position, hinge arm is rotated an angle between 108-112 degrees about the hinge arm rotation axis relative to the closed position.

9. The assembly as recited in claim 1, wherein the cam and hinge arm are configured to permit movement of the hinge arm between the at least one intermediate position, the closed position, and the fully open position upon application of a force equal to or greater than a threshold force.

10. The assembly as recited in claim 1, wherein:

the assembly is configured to permit rotation of a door subassembly of a tailgate assembly of a motor vehicle, the tailgate assembly includes a frame assembly providing a cargo bed access opening, the door subassembly is configured to close the cargo bed access opening when the hinge arm is in the closed position, and the door subassembly is configured to permit access through the cargo bed access opening when the hinge arm is in the at least one intermediate position and the fully open position.

11. The assembly as recited in claim 10, wherein the body side bracket is mounted to the frame assembly.

12. The assembly as recited in claim 10, wherein, when the hinge arm is in the closed position, wherein the tailgate assembly is pivotable about a horizontal axis between a tailgate closed position and a tailgate open position.

13. The assembly as recited in claim 12, wherein the hinge arm is rotatable about a hinge arm rotation axis perpendicular to the horizontal axis.

14. An assembly for a motor vehicle, comprising:

a body side bracket configured to be mounted to a body of a motor vehicle;

a hinge arm rotatably mounted to the body side bracket, wherein the hinge arm is rotatable between a closed position and a fully open position;

a detent arm rotatably mounted to the body side bracket;

a cam mounted to the hinge arm and configured to travel along the detent arm with movement of the hinge arm, wherein the cam and detent arm are configured to stop and hold the hinge arm in at least one intermediate position between the closed position and the fully open position, wherein, when the hinge arm is in the fully open position, the hinge arm is rotated an angle greater than 90 degrees about a hinge arm rotation axis relative to the closed position; and a door side bracket mounted to the hinge arm, wherein the door side bracket is rotatable with the hinge arm, wherein the door side bracket is configured for mounting to a door of the motor vehicle, and wherein the door side bracket includes a slot and the hinge arm includes an opening, and wherein the door side bracket is mounted to the hinge arm via a fastener arranged relative to the slot of the door side bracket and the opening of the hinge arm.

15. The assembly as recited in claim 14, wherein the hinge arm includes a mounting lobe configured to receive another fastener, and wherein the hinge arm is further mounted to the door side bracket via the other fastener.

* * * * *